Sept. 8, 1953 F. H. BRAY ET AL 2,651,680
DUAL-USE REGISTER SENDER
Filed Feb. 2, 1949 7 Sheets-Sheet 1

INVENTORS
FREDERICK H. BRAY
MICHAEL T. WILSON
DOUGLAS H. ORMOND
STANLEY G. W. JOHNSTONE
BY
Robert Harding Jr.
ATTORNEY Sept. 8, 1953

F. H. BRAY ET AL

DUAL-USE REGISTER SENDER 2,651,680

Filed Feb. 2, 1949

7 Sheets-Sheet 2

INVENTORS
FREDERICK H. BRAY
MICHAEL T. WILSON
DOUGLAS H. ORMOND
STANLEY G. W. JOHNSTONE
BY
Robert Harding Jr.
ATTORNEY Sept. 8, 1953 F. H. BRAY ET AL 2,651,680

DUAL-USE REGISTER SENDER

Filed Feb. 2, 1949 7 Sheets-Sheet 3

INVENTORS
FREDERICK H. BRAY
MICHAEL T. WILSON
DOUGLAS H. ORMOND
STANLEY G. W. JOHNSTONE
BY [signature]
ATTORNEY FIG.4 REGISTER CONTROLLER FINDER
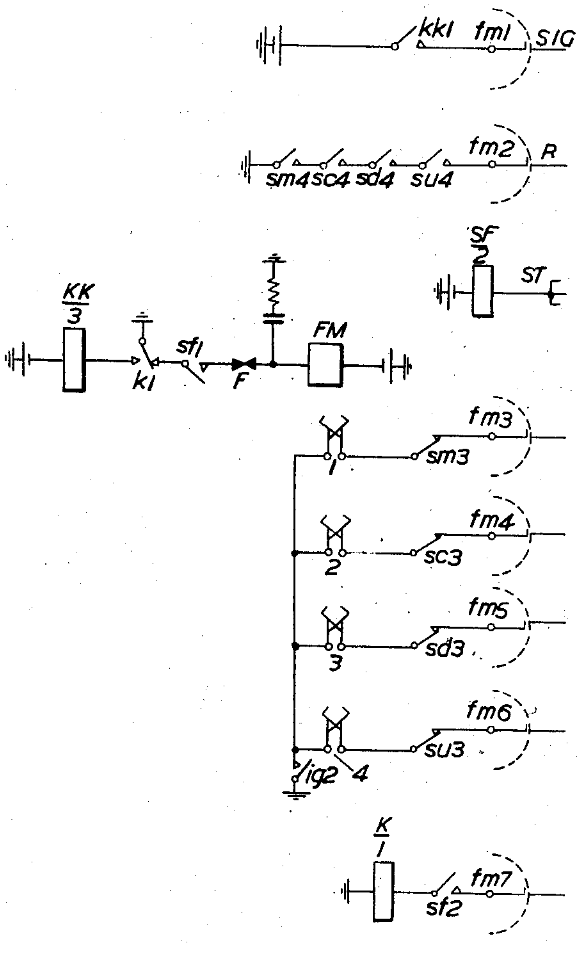
INVENTORS
FREDERICK H. BRAY
MICHAEL T. WILSON
DOUGLAS H. ORMOND
STANLEY G. W. JOHNSTONE
BY
Robert Harding Jr
ATTORNEY INVENTORS
FREDERICK H. BRAY
MICHAEL T. WILSON
DOUGLAS H. ORMOND
STANLEY G. W. JOHNSTONE
BY
Robert Harding Jr.
ATTORNEY Sept. 8, 1953

F. H. BRAY ET AL 2,651,680

DUAL-USE REGISTER SENDER

Filed Feb. 2, 1949

7 Sheets-Sheet 6

INVENTORS
FREDERICK H. BRAY
MICHAEL T. WILSON
DOUGLAS H. ORMOND
STANLEY G. W. JOHNSTONE
BY
Robert Harding Jr.
ATTORNEY Inventor
F. H. Bray
M. T. Wilson
D. H. Ormrod
S. G. W. Johnstone
By Robert Harding Jr.
Attorney Patented Sept. 8, 1953

2,651,680

UNITED STATES PATENT OFFICE 2,651,680

DUAL-USE REGISTER SENDER

Frederick Harry Bray, Michael Thain Wilson, Douglas Henry Ormrod, and Stanley George William Johnstone, London, England, assignors to International Standard Electric Corporation, New York, N. Y., a corporation of Delaware Application February 2, 1949, Serial No. 74,222
In Great Britain February 3, 1948

7 Claims. (Cl. 179—18)

This invention relates to automatic telecommunication exchange systems and to subscriber identification arrangements therefor.

The object of the invention is to provide improved calling party identification arrangements in exchanges using register controllers.

Register controllers which are adapted to record exchange code digits and also subscribers' numerical digits, are well known.

It is also known to originate certain classes of calls by dialling code digits characterising the particular service required, without the addition of further digits denoting subscribers numbers.

It is proposed that, in the latter circumstances, the local or subscriber digit registers in the register controllers shall be utilised in connection with calling party identification.

One feature of the present invention comprises an automatic telephone exchange of the type employing register controllers for setting up connections in which registers in the register controller normally used for storing digits of the called party's number are used on special service calls for storing digits of the calling party's number.

The term "special service calls" is used to cover such calls as trunk or toll calls for which a special signal is dialled by a subscriber.

A further feature of the present invention comprises an automatic telecommunication exchange of the type employing register controllers for setting up connections in which the register controller is arranged to record digits transmitted by a calling party for call routing purposes and digits identifying the calling party and in which the register-controller controls the setting up of a connection in accordance with said call routing digits to a storage circuit into which the calling party digits are transmitted for use in a later stage of the connection.

The nature of the invention will be described with reference to Figs. 1 to 8 of the accompanying drawings in which:

Figs. 3 and 4 show the identification control circuit;

Figure 5:
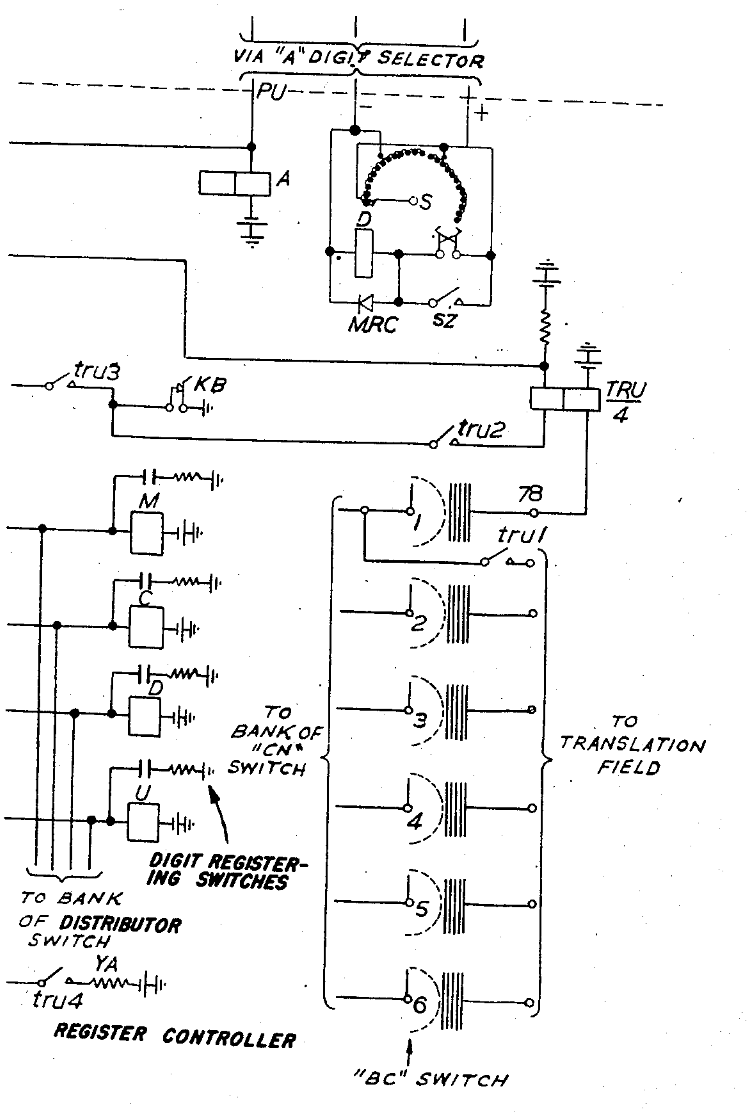
Fig. 5 shows part of the register controller circuit.
Figure 6:
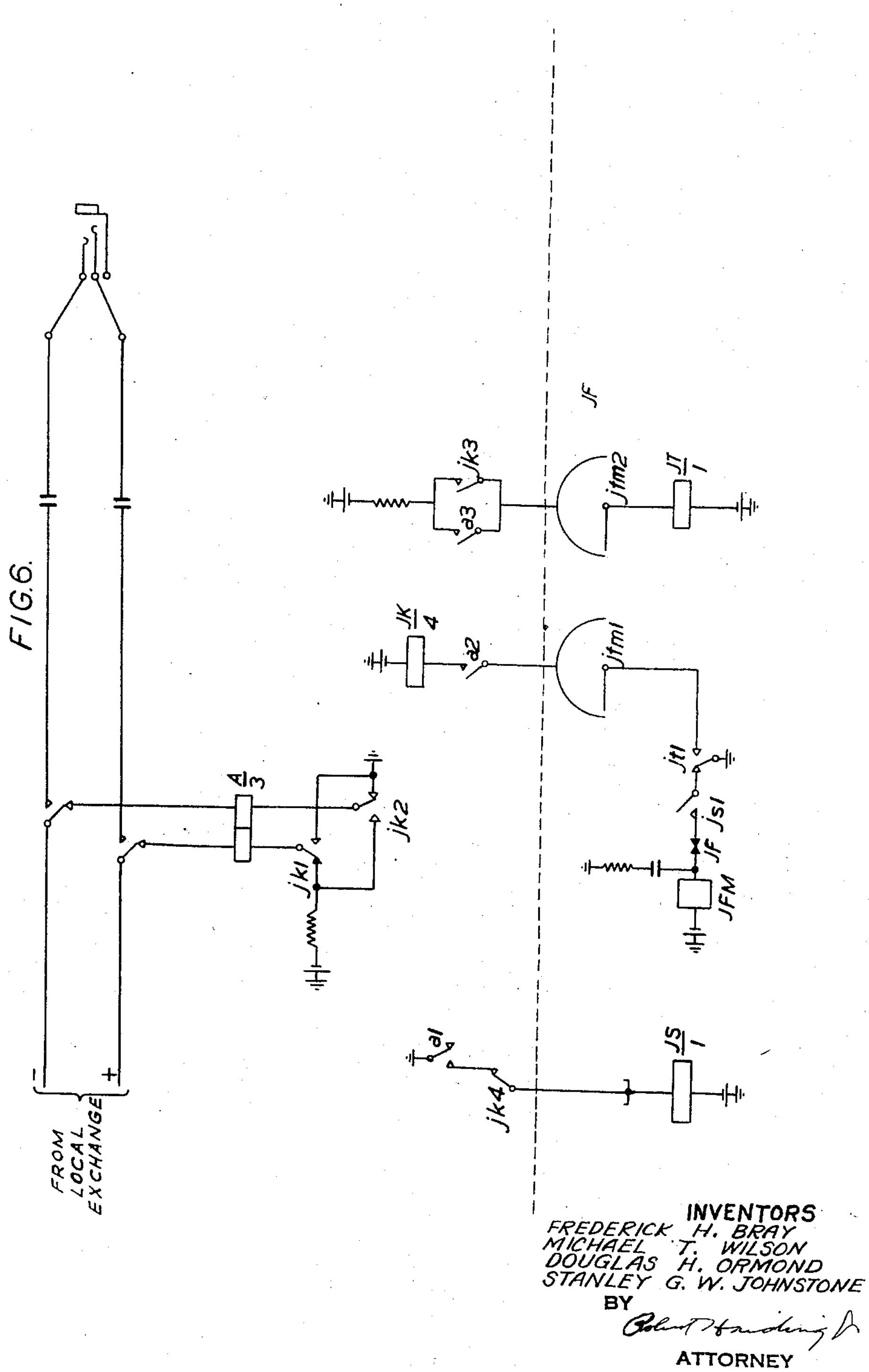
Figure 8:
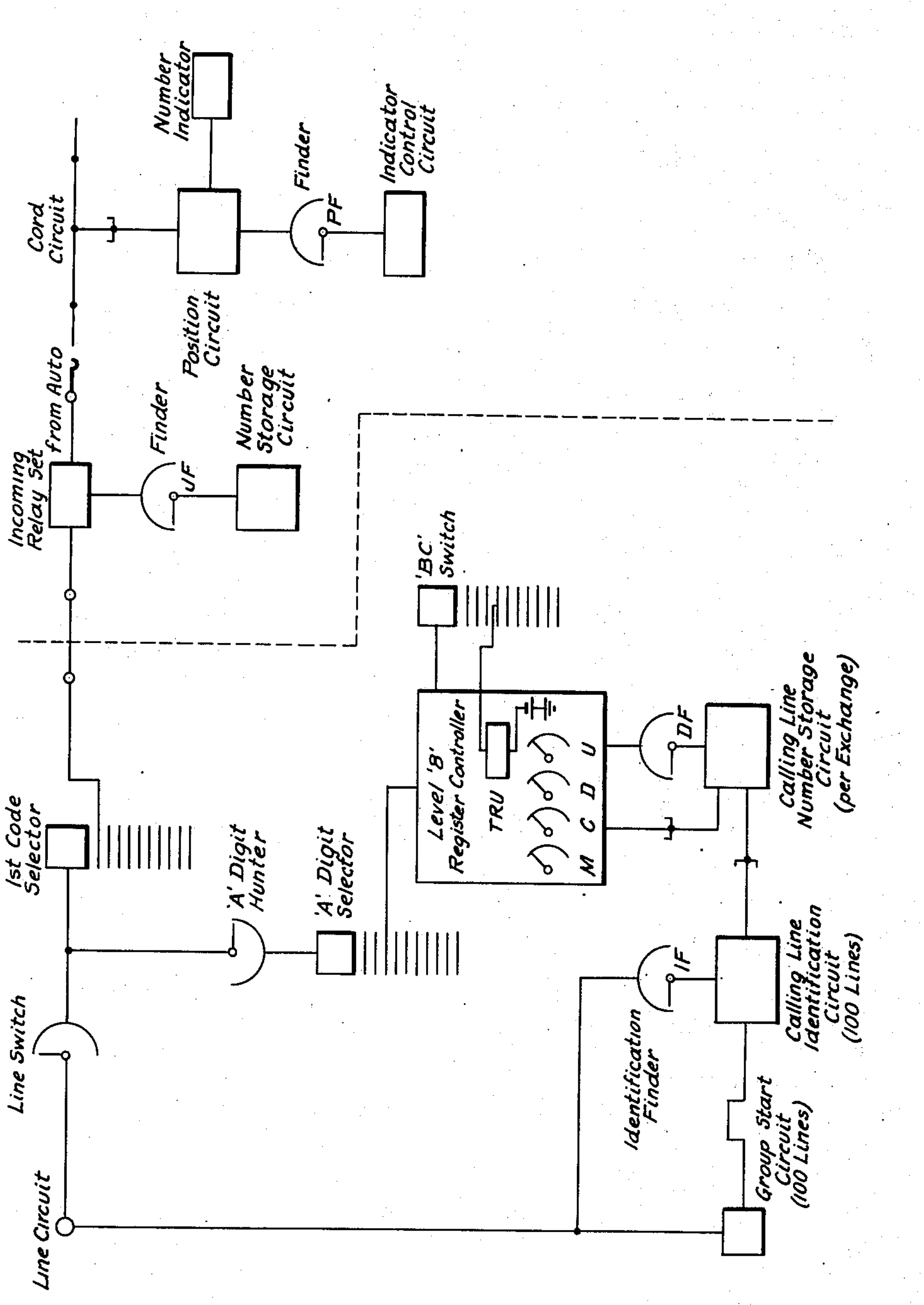

Fig. 6 illustrates part of an incoming junction equipment storage circuit to manual trunk board and number for use with a system such as is shown in Figs. 1–5, Fig. 7 shows how Figs. 1–5 should be placed together; and Fig. 8 is a diagrammatical representation of an automatic telephone exchange system according to the invention and incorporating register controllers or "directors" in well known manner.

Referring first to Fig. 8, the equipment at the exchange comprises, in well known manner, line circuits, line switches, 1st code selectors, "A" digit finders or hunters, "A" digit selectors, register controllers and "BC" switches and junctions outgoing to trunk operator positions. In addition, there are provided, one calling line number storage circuit per exchange connected to "level 8" register controllers by means of finders DF, calling line identification circuits and group start circuits (one per hundred lines) and identification finders associating the calling line identification circuits with the line circuits, as will be later described.

The basis of the scheme is to make use of the M, C, D, and U uniselectors or digit registers of the register controller, which are normally not brought into use when the originating subscriber at a register controller exchange dials special service digits, such as TRU, for storing the calling party's number. It will first be assumed that the incoming junctions on the trunk board are labelled with the name of the originating exchange and therefore it is only necessary to identify the numerical digits of the calling subscriber's number, as the operator will know by inspection the name of the originating exchange.

All calls for TRU will be routed via "level 8" of the register controllers, the BC switch being positioned on level 7, outlet 8 (since TRU is the same as 878 on the dial), and to this outlet is connected relay TRU of the register controller (Fig. 5). Hence relay TRU operates on all calls to trunks. Relay TRU applies a start signal to the called number circuit which now is to be used as the calling number storage circuit, which start signal causes DF to find the originating register controller, providing that the calling number storage circuit is free. When seized, this circuit applies a small positive potential to the incoming pulse lead PU of the register controller, thence to the 1st code selector via the A digit selector and the A digit hunter. In the PU connection between the A digit hunter and 1st code selector a relay is inserted and an identification start signal is applied to the incoming PU lead of the 1st code selector. This start signal is a low positive potential and is relayed on to the P lead of the subscriber's line circuit.

The subscribers are arranged numerically in groups of 100, each group having one start circuit and one identification finder circuit as already explained. The start circuit includes a pilot relay which is inserted in the battery lead common to all the subscribers' meters in the group. This relay is, however, of low resistance and has little effect on the meter operating current. A connection is made from the P wire of each line in the group to one outlet of the identification finder which is of the 50 outlet type. Therefore, by utilising two banks, 100 lines can be connected to the switch.

The application of the positive potential to the P wire operates the pilot relay which causes the finder to hunt till it finds the marked P wire. The position on which the identification finder has stopped therefore gives an indication of the tens and units digits of the subscriber's number. Due to the subscribers' lines being in groups of 100, the thousands and hundreds digits are the same for each group and it is unnecessary to identify these two digits. Strapping to the appropriate terminal of a uniselector in the identification control circuit enables this to be done.

When the finder has found the marked line, the calling number is transferred to the calling number transmitter circuit by means of the uniselector which is stepped at 10 I. P. S. Each of the four banks of this uniselector is connected to the identification finder circuit, the four banks representing the thousands, hundreds, tens and units digits. As this uniselector steps round, impulses are sent to the register controller until the selector reaches a marked position on the finder banks, when the corresponding impulsing circuit to the register controller is disconnected.

When all digits have been transmitted to the register controller, the TRU relay is released, thereby releasing all the identification equipment at the local exchange.

As stated above, four trains of impulses are transmitted to the register controller from the identification circuits, each digit being transmitted along one wire which is connected to the corresponding uniselector or register in the register controller where it is registered, i. e. the thousands digit stored on M, the hundreds on C, the tens on D, and the units on U.

As described previously, relay TRU now releases and the identification equipment is released.

The register controller has meanwhile sent out the appropriate translation of the service code TRU to the 1st code selector which has routed the call to an incoming relay set at the trunk exchange. The seizure of this circuit causes finder JF to hunt for a free number storage circuit. When this is found the battery supply to the incoming lines is reversed, thus giving a pulse start signal to the register controller to start pulsing out. These pulses are sent out by the M, C, D and U switches of the register controller in the well known manner and are received by the incoming relay which retransmits them to the number storage circuit. When all four digits have been sent, the register controller and A digit selectors release in the usual way.

At the same time as the pulse start signal is applied to the register controller, the calling signal is given. The operator answers in the normal way by inserting her answer plug in the jack connected with the junction in use, thus operating the sleeve relays (not shown). Indication of the calling number may be initiated manually by the operation of an identification key or automatically by a signal given automatically on the insertion of the answering plug. For both methods there is associated with each position circuit a number indicator and control circuit. When the initiation signal is given, either automatically or manually, the number storage circuit sends out pulses via the sleeve connection to the indicator control circuit which steps the indicator. As mentioned earlier, the junction jack will be labelled with the name of the originating exchange; therefore, only the numerical digits are required on the indicator.

After the last digit has been received, an "Identification complete" signal is given to the operator who releases the indicator control circuit, and number storage circuit by restoring the identification key or by operating a cancel key, dependent upon whether initiation is manual or automatic.

Figure 1:
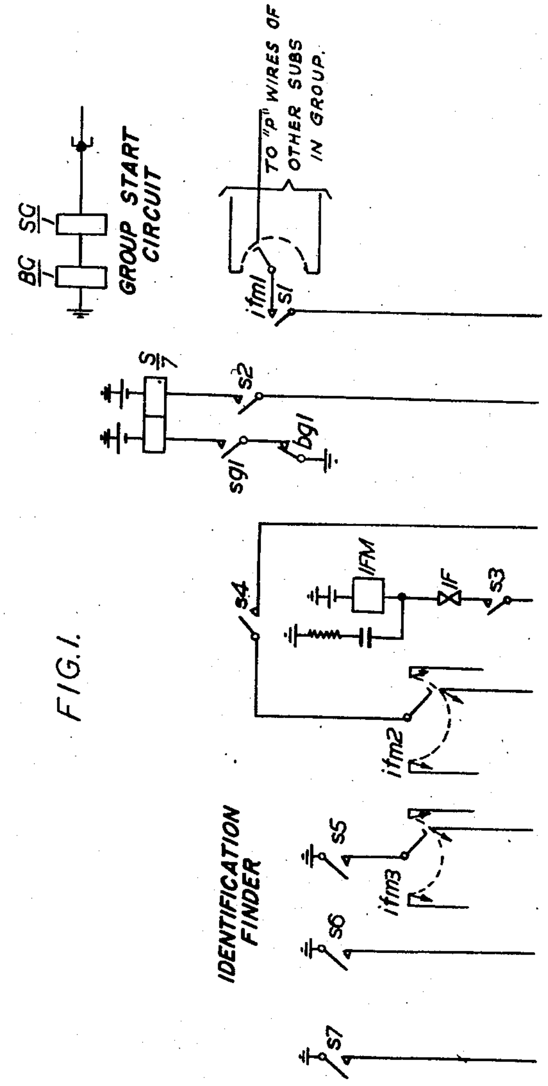
Fig. 1 shows a group start circuit and identification finder circuit.
Figure 2:
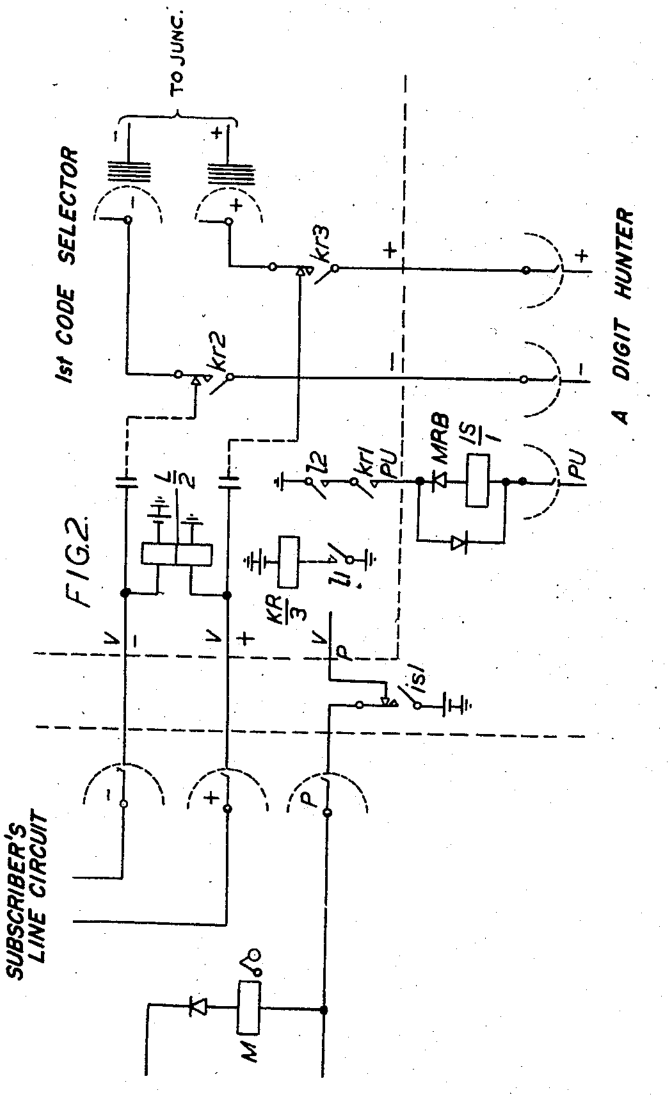
Fig. 2 shows parts of a subscriber's line circuit, first code selector and A digit hunter.
Figures 3, 7:
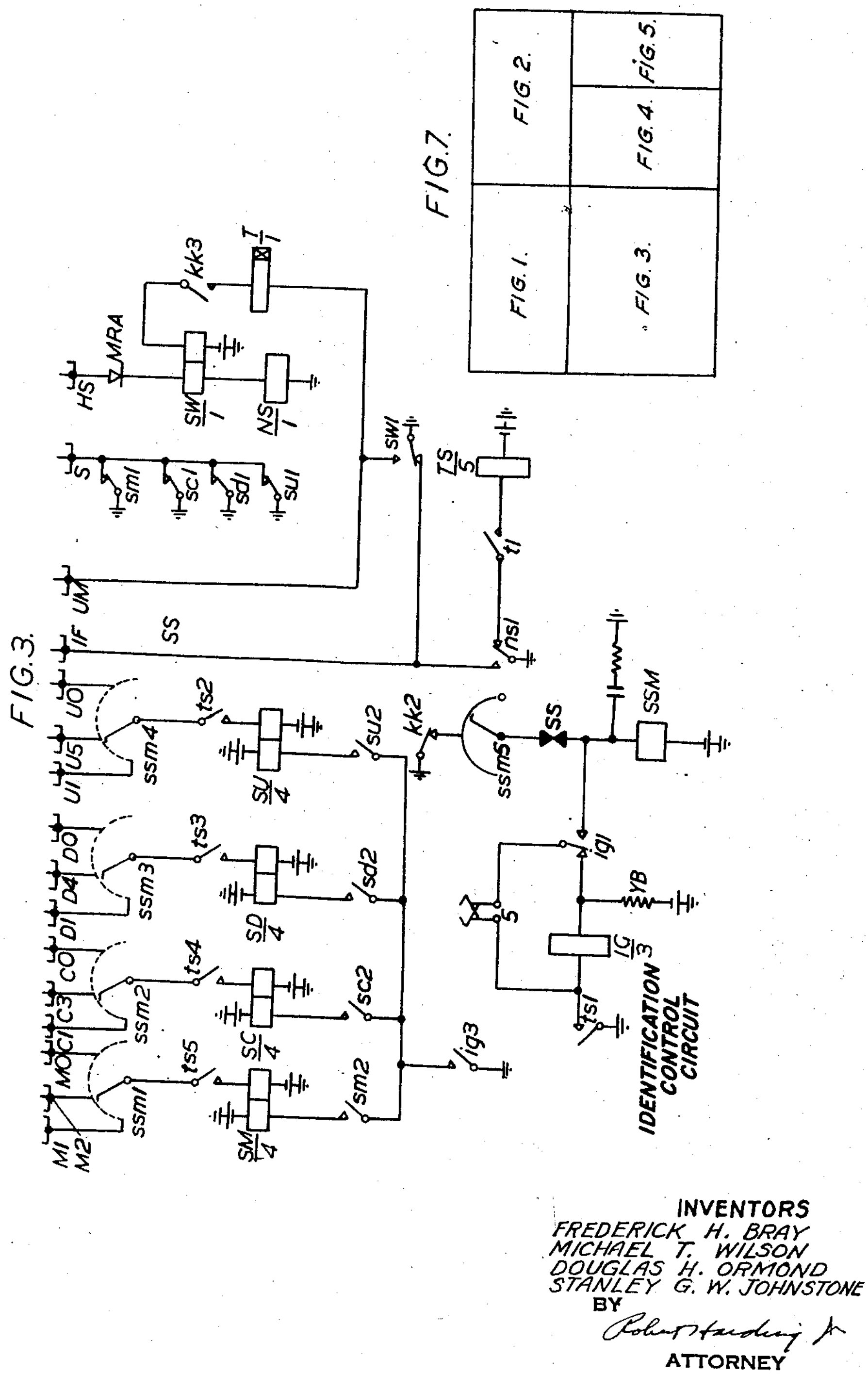

Referring now to Figs. 1–5, these should be placed together as shown in Fig. 7. Only those parts of the register controller circuit relevant to the present invention are shown. A description of the operation of the register controller or director system will be found in some text books (e. g. "Telephony," by Herbert and Proctor, vol. II, pages 303–334).

Relay TRU (Fig. 5) is connected as already stated to level 7, outlet 8 of bank 1 of the "BC" switch (Fig. 5) of the register controller, and is operated from earth via a bank of the control switch CN, of the register controller (not shown). Contact *tru1* up connects the wiper of bank 1 of the "BC" switch to the appropriate position of the translation field (not shown) and transmission of routing digits occurs in the usual manner. Relay TRU locks on its second winding in series with contact *tru2* up and key KB. At contact *tru3* up an operating circuit is closed for the start relay SF (Fig. 4) of the identification control circuit (Figs. 3 and 4), also in series with KB. Contact *tru4* applies a marking potential to the appropriate contact of bank *fm7* of the register controller finder switch F (Fig. 4).

Only one control circuit is provided per exchange to ensure that only one line is identified at the trunk exchange at one time. If the control circuit is engaged when relay TRU operates, relay SF is already operated and no further operation in connection with the present call can occur until the control circuit is released.

Assuming that the control circuit is free when relay TRU operates, followed by relay SF, contact *sf1* completes a driving circuit for magnet of the register controller finder FM (Fig. 4) over *sf1* up and *k1*. Finder switch F hunts until it finds the marking potential on bank *fm7* (Fig 4), whereupon relay K operates over contacts *sf2* up, bank *fm7*, contact *tru4* up and resistance YA. Contact *k1* breaks the driving circuit of magnet FM and operates relay KK. A positive potential operates relay IS (Fig. 2) from *kk1* (Fig. 4), bank *fm1*, PU lead of the "A" digit selector and "A" digit hunter switch, winding IS, rectifier MRB, and contacts *kr1* and *l2* of the first code selector, relay L having operated when the call originated and having operated KR. Operation of relay IS replaces the busying earth applied to the "P" wire by the 1st code selector by a discrete positive potential known as the identification start signal. This is of such a value as to maintain the busy condition on the "P" wire and to operate relay SG in the group start circuit (Fig. 1) without operating the subscriber's meter. An arrangement in which a relay SG operates in similar manner is more fully described in U. S. applications Serial Nos. 724,303 and 724,304, both filed January 25, 1947.

The subscribers' lines are arranged in strict numerical order in groups of 100, each group being connected to a group start circuit, as described in the above quoted applications. Relay BG (Fig. 1) is a booster guard relay and operates in series with relay SG only when one of the subscribers in the group is being metered. Operation of relay BG breaks the operating circuit of relay S, thereby preventing operation of the group start circuit.

When relay SG operates in response to an identification start signal, relay S operates over contacts *sg1* up and *bg1* and locks on its second winding over *s2* up to the earths on *sm1*, *sc1*, *sd1*, and *su1*. A driving circuit for switch magnet IFM of identification finder switch IF (Figs. 1 and 2) is completed via *sw1*, *s3* up and the interrupter of switch IF. The "P" wires of the hundred lines in the group are connected in numerical order to switch bank *ifm1*.

For the purpose of this explanation it will be assumed that the number of the calling line is 2345. The hundreds and thousands digits are common to all lines in the group and can therefore, be indicated by the operation of the appropriate S relay. By suitable strapping contact *s7* is connected to lead M2 which indicates thousands digit 2 and contact *s6* is connected to lead C3 to indicate hundreds digit 3.

The identification start signal is marking contact 45 of switch bank *ifm1* and switch IF hunts until it finds this contact, whereupon relay SW operates via contact 45 of *ifm1*, contact *s1* up, rectifier MRA and winding of relay NS, but only relay SW operates. At *sw1* the driving circuit of switch magnet IFM (Fig. 1) is broken, and relay T operates over contact *kk3* up and *sw1* up and the holding winding of relay SW which holds under control of relay KK. The position of switch IF is indicative of the tens and units digits of the calling number. By strapping on banks *ifm2* and *ifm3*, ten leads each corresponding to a tens digit are connected to leads D1–D0, and ten leads each corresponding to a units digit are connected to leads U1–U0.

The appropriate leads are marked by an earth in the following manner. Contact *s5* marks the tens lead via bank *ifm3* and contacts *sw1* and *s4* in series mark the units lead via switch bank *ifm2*. In the present example, leads D4 and U5 will be marked.

If a metering potential is found on *ifm1*, both relays SW and NS operate. Contact *sw1* breaks the original driving circuit of magnet IFM, as before, but *ns1* applies an earth to magnet IFM, causing it to step again and release relays NS and SW, replacing the original earth over *sw1*, and switch IF continues to hunt. Relay T is slow to operate and so does not operate when SW operates on receipt of a metering signal.

Contacts 2–11 of the identification control banks *ssm1*, 2, 3 and 4 of switch SS (Fig. 3) are connected respectively to the thousands, hundreds, tens and units marking leads. Hence a marking earth will be applied to *ssm1* contact 3, *ssm2* contact 4, *ssm3* contact 5, and *ssm4* contact 6. This is for the previously quoted number of 2345, and the marked contacts are as stated since the "zero" or rest position of each bank wiper is on its first terminal.

When switch IF finds the marked line on bank *ifm1* (Fig. 1), relay T operates as described above, and operates relay TS over *ns1* back and *t1* up. When impulse springs 5 (Fig. 3) open, relay IG operates via *ts1* up, winding of IG and resistance YB. Contacts *ig1* connect impulse springs 5 to the driving magnet SSM (Fig. 3) of switch SS, which now steps under the influence of these springs. Contact *ig2* up connects earth to impulse springs 1, 2, 3 and 4 (Fig. 4) and *ig3* prepares a locking circuit for relays SM, SC, SD and SU (Fig. 3).

On the first impulse, the digit register switches M, C, D and U (Fig. 5) in the register controller and switch SS (Fig. 3) in the control circuit step to contact 2, but this contact is not marked on any of the banks of switch SS. On the second impulse these switches step to their contacts 3 and relay SM operates via *s7* (Fig. 1), M2 lead, contact 3 of *ssm1* (Fig. 3), *ts5* up and SM winding, and locks on its second winding over *sm2* up, and *ig3* up. The stepping circuit for the magnet at switch M is broken at *sm3* (Fig. 4), and switch M stops on position 3, corresponding to the first, or thousands, digit 2. On the third impulse switches SS, C, D and U step to their fourth contacts, and relay SC (Fig. 3) finds a marking earth on contact 4 of bank *ssm2* and operates via *s6* up, C3 lead, contact 4 of bank *ssm2* and contact *ts4* up, and locks on its second winding over contacts *sc2* up and *ig3* up. Contact *sc3* (Fig. 4) breaks the stepping circuit of switch C (Fig. 5), which is, therefore stopped on position 4, corresponding to the second or hundreds digit 3. Similarly relay SD operates to *ssm3* on contact 5 to stop switch D on contact 5 (corresponding to the third or tens digit 4), the operating circuit for relay SD being over *s5*, bank *ifm3* of switch IF, D4 lead, *ssm3* (fifth contact) and *ts3* (locking on its second winding over *sd2* and *ig3*). Relay SU operates to contact 6 of *ssm4*, to stop switch U on contact 6 (corresponding to the fourth or units digit 5), the operating circuit of SU being via contacts *sw1*, *s4*, bank *ifm2* of switch IF, U5 lead, contacts *ssm4* and *ts2*.

It will be noted that relays SM, SC, SD and SU operate independently of one another and in any order, depending on the values of the relative digits to which each responds. It will also be noted that the digit storing switches M, C, D and U step simultaneously, so that the maximum time required to set all four switches is no greater than the time required to set the switch which has the largest digit to record.

When relays SM, SC, SD and SU are all operated the holding circuit of relay S (Fig. 1) is broken when contacts *sm1*, *sc1*, *sd1* and *su1* (Fig. 3) are all opened. Contacts *sm4*, *sc4*, *sd4* and *su4* (Fig. 4) when all closed apply an earth via bank *fm2* of switch F to the R lead and thence to the holding winding of relay TRU (Fig. 5), short-circuiting it and causing it to release. This relay releases relay SF (Fig. 4) at *tru3*, and releases relay K (Fig. 4) at *tru4*, which releases relay KK (Fig. 4) at K1. Contact *kk1* removes the operating potential of relay IS (Fig. 2), *kk2* prepares a homing circuit for switch SS (Fig. 3) and *kk3* releases relay T and breaks the holding circuit of relay SW. On the release of relay IS (Fig. 2) the identification start signal is removed from the "P" wire, and relay SG (Fig. 1) releases and in turn releases relay S. Relay TS (Fig. 3) is released at *t1*, and IG is released at *ts1*. Contact *ig3* breaks the holding circuits of relays SM, SC, SD and SU, which release. Switch SS drives home via contact *kk2*, homing bank *ssm5*, and SS interrupter springs.

Both the control and group start circuits are now released, and the identified number is stored on the numerical switches M, C, D and U of the register controller, and the control circuit may now be seized by another register controller. While identification has been taking place, the register controller has performed its usual functions and transmitted the relevant digital impulse trains to rout the call to the trunk exchange. When connection to the trunk exchange is made an incoming junction circuit is seized and relay D operates to potentials on the positive and negative leads, in known manner.

Fig. 6 illustrates the relevant portion of an incoming junction equipment and number storage circuit. With relay D (Fig. 5) operated the register controller is prevented from transmitting the numerical digits, this being the system usually adopted for coder call indicator or CCI working. The contacts of relay D are not shown in Fig. 5, but a description of register controller operation into CCI equipment will be found in the previously quoted reference.

When relay A (Fig. 6) operates in response to an incoming signal, relay JS operates over *a1* up and *jk4*, and *js1* completes a driving circuit for magnet JFM of switch JF, which hunts until it finds the marking potential supplied by *a3* to bank *jfm2*, whereupon relay JT operates, and at *jt1* opens the circuit of JFM and operates relay JK over contact *a2* up, contact on bank *jfm1* and contact *jt1* up. Contacts *jk1* and *jk2* reverse the potentials on the leads incoming from the local exchange, and relay D in the register controller (Fig. 5) releases, indicating that a number storage circuit has been seized and that transmission of the numerical digits can take place.

The register controller (Fig. 5) will now function in the normal well-known manner to transmit the four digits stored on the numerical switches, as described in the previously quoted reference. These digits are stored in the number storage circuit by means not shown and may be displayed to a utiliser by the operator in any convenient manner.

It has been assumed that the incoming junctions on the trunk board are labelled with the name of the originating exchange and that only the numerical digits of the calling subscriber's number required identification.

In some case, however, it may be necessary to prefix the numerical digits by a code indicative of the originating exchange. Use may be made of the facts that the register controller is normally capable of sending a translation code up to a maximum of six digits and that the number of digits required to route a call from an automatic exchange to the trunk board normally requires not more than three digits. Since the D relay in the register controller operates to prevent transmission of translated code digits until the receiving end of the line is prepared to accept them, as for instance in CCI working, the register controller may be strapped and arranged to work in known manner to transmit up to, say, three translation code digits, to cause routing of the call to the trunk board, after which relay D operates as already described. When current on the line is reversed and relay D releases, some or all of the unused six translation code digits may be sent by the register controller, followed by the M, C, D and U digits as already described. By suitable translation strapping of these last-mentioned translation code digits, indication of the originating exchange (or other required information such as type of line—single, party, pay box, etc.) may be conveyed to the operator.

On completion of transmission of the numerical digits, the register controller and the "A" digit selector release leaving the connection switched through the 1st code selector, all in known manner.

While the principles of the invention have been described above in connection with specific embodiments, and particular modifications thereof, it is to be clearly understood that this description is made only by way of example and not as a limitation on the scope of the invention.

What is claimed is:

1. An automatic telecommunication exchange comprising a register controller, a plurality of registers in said register controller, means under control of a calling line and responsive to a predetermined signal for storing digits of the called party's number in said registers, and means responsive to a predetermined different signal representing a special service call and under control of the calling line for storing digits of the calling party's number in said same registers.

2. An automatic telecommunication exchange comprising a register controller for setting up connections, means including a storage circuit in said register controller for recording digits received from a calling line in response to predetermined signals from said line for call routing purposes, means for recording digits identifying the calling line in response to other predetermined signals, means under control of said first recording means for setting up a connection in accordance with the recorded call routing digits, and means controlled by said recording means for transmitting said calling party digits to said storage circuit.

3. An automatic telecommunication exchange, as claimed in claim 1, in which the means for storing digits of the calling party's number comprises calling party identification equipment, and further comprising a control circuit controlled by the register controller for bringing said identification equipment into use to identify the calling line and to transmit the identity of the calling line to said register controller.

4. An automatic telecommunication exchange, as claimed in claim 2 in which the means for storing digits of the calling party's number comprises calling party identification equipment, and further comprising a control circuit controlled by the register controller for bringing said identification equipment into use to identify the calling line and to transmit the identity of the calling line to said register controller.

5. An automatic telecommunication exchange, as claimed in claim 1, in which the means responsive to a special service digit comprises means in the register controller for receiving special service digits, means for registering digits identifying the calling party, means for transferring the digits so registered to the storing means, and means for setting up a special service call in response to said special service digits.

6. An automatic telecommunication exchange, as claimed in claim 2, in which the means in the register controller for recording digits comprises means for receiving special service digits, means for registering digits identifying the calling party, means for transferring the digits so registered to the storing means, and means for setting up a special service call in response to said special service digits.

7. An automatic telecommunication exchange, as claimed in claim 6, in which the means in the register controller for recording digits further comprises means responsive to the receipt of the special service digits for initiating calling party identification.

FREDERICK HARRY BRAY.
MICHAEL THAIN WILSON.
DOUGLAS HENRY ORMROD.
STANLEY GEORGE WILLIAM JOHNSTONE.

References Cited in the file of this patent

UNITED STATES PATENTS

| Number | Name | Date |
|---|---|---|
| 1,846,516 | Haines | Feb. 23, 1932 |
| 2,337,642 | Bush | Dec. 28, 1943 |
| 2,342,279 | Hersey | Feb. 22, 1944 |
| 2,385,228 | Ostline | Sept. 18, 1945 |
| 2,426,981 | Blake | Sept. 9, 1947 |